US011633994B2

(12) United States Patent
Yu et al.

(10) Patent No.: US 11,633,994 B2
(45) Date of Patent: Apr. 25, 2023

(54) VEHICLE-TRAILER DISTANCE DETECTION DEVICE AND METHOD

(71) Applicant: Continental Automotive Systems, Inc., Auburn Hills, MI (US)

(72) Inventors: Xin Yu, Wuhu-Jiujiang (CN); Dhiren Verma, Farmington Hills, MI (US); Dominik Froehlich, Ferndale, MI (US)

(73) Assignee: CONTINENTAL AUTONOMOUS MOBILITY US, LLC., Auburn Hills, MI (US)

( * ) Notice: Subject to any disclaimer, the term of this patent is extended or adjusted under 35 U.S.C. 154(b) by 1009 days.

(21) Appl. No.: 16/364,151

(22) Filed: Mar. 25, 2019

(65) Prior Publication Data

US 2019/0308473 A1 Oct. 10, 2019

Related U.S. Application Data

(60) Provisional application No. 62/652,707, filed on Apr. 4, 2018.

(51) Int. Cl.
*B60D 1/36* (2006.01)
*B60W 50/00* (2006.01)

(52) U.S. Cl.
CPC ...... *B60D 1/363* (2013.01); *B60K 2370/1438* (2019.05); *B60R 2300/105* (2013.01);
(Continued)

(58) Field of Classification Search
CPC .. B60D 1/36; B60D 1/363; B60D 1/62; B60R 1/003; B60R 2300/105; B60R 2300/808;
(Continued)

(56) References Cited

U.S. PATENT DOCUMENTS 7,005,974 B2 * 2/2006 McMahon ............... B60R 1/00
396/419
8,038,166 B1 * 10/2011 Piesinger ............... B60D 1/06
340/686.2
(Continued)

FOREIGN PATENT DOCUMENTS

DE 102012018914 A1 3/2014
EP 3299191 A1 3/2018
(Continued)

OTHER PUBLICATIONS

Japanese Office Action dated Nov. 29, 2021 for the counterpart Japanese Patent Application No. 2020-554072.
(Continued)

*Primary Examiner* — Daniel L Greene

(57) ABSTRACT

A method for determining a distance between a camera positioned on a rear portion of a tow vehicle and a trailer coupler supported by a trailer positioned behind the tow vehicle as the tow vehicle approaches the trailer. The method includes identifying the trailer coupler of the trailer within one or more images of a rearward environment of the tow vehicle. The method also includes receiving sensor data from an inertial measurement unit supported by the tow vehicle. The method includes determining a pixel-wise intensity difference between a current received image from the one or more images and a previously received image from the one or more images. The method includes determining the distance based on the identified trailer coupler, the sensor data, and the pixel-wise intensity difference, the distance includes a longitudinal distance, a lateral distance, and a vertical distance.

23 Claims, 7 Drawing Sheets

(52) U.S. Cl.
CPC ............... *B60R 2300/808* (2013.01); *B60W 2050/0005* (2013.01); *B60W 2420/403* (2013.01); *B60Y 2300/28* (2013.01); *B60Y 2400/3015* (2013.01)

(58) Field of Classification Search
CPC . B60W 2050/0005; B60W 2050/0052; B60W 2050/146; B60W 2420/403; B60W 2420/42; B60W 2520/105; B60W 2520/125; B60W 2554/801; B60W 2554/802; B60W 2554/805; B60W 50/0098; B60Y 2200/147; B60Y 2300/28; B60Y 2400/3015; G06V 10/147; G06V 10/255; G06V 20/58
See application file for complete search history.

(56) References Cited

U.S. PATENT DOCUMENTS

| | | | |
|---|---|---|---|
| 8,605,949 | B2 | 12/2013 | Zhang |
| 2005/0074143 | A1 | 4/2005 | Kawai |
| 2010/0265048 | A1* | 10/2010 | Lu .......................... B60C 9/005 340/435 |
| 2014/0012465 | A1* | 1/2014 | Shank ................. B62D 15/0285 701/36 |
| 2014/0151979 | A1 | 6/2014 | Puckett et al. |
| 2015/0077557 | A1 | 3/2015 | Han |
| 2015/0321666 | A1 | 11/2015 | Talty |
| 2017/0113641 | A1* | 4/2017 | Thieberger .............. B60R 21/04 |
| 2017/0341583 | A1* | 11/2017 | Zhang .................... H04N 7/181 |
| 2018/0081370 | A1 | 3/2018 | Miller et al. |
| 2019/0337343 | A1* | 11/2019 | Ramirez Llanos ...... B60D 1/36 |

FOREIGN PATENT DOCUMENTS

| | | |
|---|---|---|
| JP | 2005112004 A | 4/2005 |
| JP | 2016148512 A | 8/2016 |
| JP | 2017078692 A | 4/2017 |
| WO | 2013081984 A1 | 6/2013 |

OTHER PUBLICATIONS

International Search Report and the Written Opinion of the International Searching Authority dated Jun. 27, 2019 for corresponding PCT Application No. PCT/US2019/024479.
European Exmaination Report dated Nov. 29, 2022 for the counterpart European Patent Application No. 19 722 238.3.

* cited by examiner

450

---

Identifying, By Data Processing Hardware, The Trailer Coupler Of The Trailer Within One Or More Images Of A Rearward Environment Of The Tow Vehicle

452

---

Receiving, At The Data Processing Hardware, Sensor Data From An Inertial Measurement Unit In Communication With The Data Processing Hardware And Supported By The Tow Vehicle

454

---

Determining, By The Data Processing Hardware, A Pixel-wise Intensity Difference Between A Current Received Image From The One Or More Images And A Previously Received Image From The One Or More Images

456

---

Determining, By The Data Processing Hardware, The Distance Based On The Identified Trailer Coupler, The Sensor Data, And The Pixel-wise Intensity Difference, The Distance Including A Longitudinal Distance, A Lateral Distance, And A Vertical Distance Between The Camera And The Trailer Coupler

VEHICLE-TRAILER DISTANCE DETECTION DEVICE AND METHOD

CROSS REFERENCE TO RELATED APPLICATIONS

This U.S. patent application claims priority under 35 U.S.C. § 119(e) to U.S. Provisional Application 62/652,707, filed on Apr. 4, 2018, which is hereby incorporated by reference in its entirety.

TECHNICAL FIELD

This disclosure relates to a device and method for detecting a distance, i.e., longitudinal distance, lateral distance, and vertical distance, between a camera positioned on a back portion of a tow vehicle and a trailer coupler of a trailer positioned behind the tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicles. As such, it is desirable to provide a system that is capable of determining a distance between a vehicle and a trailer for aiding the driver in hitching a trailer to the tow vehicle.

SUMMARY

One aspect of the disclosure provides a method for determining a distance between a camera positioned on a rear portion of a tow vehicle and a trailer coupler supported by a trailer positioned behind the tow vehicle as the tow vehicle approaches the trailer. The method includes: identifying, by data processing hardware, the trailer coupler of the trailer within one or more images of a rearward environment of the tow vehicle. The method also includes receiving, at the data processing hardware, sensor data from an inertial measurement unit in communication with the data processing hardware and supported by the tow vehicle. The method also includes determining, by the data processing hardware, a pixel-wise intensity difference between a current received image from the one or more images and a previously received image from the one or more images. Additionally, the method includes determining, by the data processing hardware, the distance based on the identified trailer coupler, the sensor data, and the pixel-wise intensity difference, the distance including a longitudinal distance, a lateral distance, and a vertical distance between the camera and the trailer coupler.

Implementations of the disclosure may include one or more of the following optional features. In some implementations, the method includes sending, from the data processing hardware to a display in communication with the data processing hardware, instructions to display the distance.

The method may further include sending, from the data processing hardware to a drive assistance system in communication with the data processing hardware, instructions to autonomously drive the tow vehicle towards the trailer based on the distance. Additionally or alternatively, the method may include determining, at the data processing hardware, a height of the trailer coupler from the ground based on the vertical distance between the camera and the trailer coupler.

In some examples, the one or more images are captured by a monocular camera. Additionally, or alternatively, the sensor data from the inertial measurement unit may include an acceleration and an angular velocity of the tow vehicle.

In some implementations, determining the distance further includes: determining one or more current filter states based on the sensor data and the identified trailer coupler; and determining one or more updated filter states based on the current filter states and the pixel-wise intensity difference. The method may further include determining the distance based on the updated filter states. In some examples, the method also includes determining a camera position in a world coordinate system based on the updated filter states.

Another aspect of the disclosure provides a method for determining a distance between a tow vehicle and a trailer positioned behind the tow vehicle as the tow vehicle approaches the trailer. The method includes receiving, at data processing hardware, one or more images from a camera positioned on a back portion of the tow vehicle. The camera is in communication with the data processing hardware. The method includes identifying, by the data processing hardware, a trailer coupler of the trailer within the one or more images. The method also includes associating, by the data processing hardware, one or more coupler feature points with the trailer coupler identified within the one or more images. The method also includes identifying, by the data processing hardware, one or more visual features within the one or more images. Additionally, the method includes associating, by the data processing hardware, one or more visual feature points with the one or more visual features identified within the one or more images. The method also includes tracking, by the data processing hardware, the one or more coupler feature points and the one or more visual feature points. In addition, the method includes receiving, at the data processing hardware, sensor data from an inertial measurement unit in communication with the data processing hardware and supported by the tow vehicle. The method also includes determining, by the data processing hardware, the distance based on the one or more coupler feature points, the one or more visual feature points, and the sensor data, the distance including a longitudinal distance, a lateral distance, and a vertical distance between the camera and the trailer coupler.

Implementations of this aspect of the disclosure may include one or more of the following optional features. In some implementations, the method includes sending, from the data processing hardware to a display in communication with the data processing hardware, instructions to display the distance.

The method may further include sending, from the data processing hardware to a drive assistance system in communication with the data processing hardware, instructions to autonomously drive the tow vehicle towards the trailer based on the distance. Additionally or alternatively, the method may include determining, at the data processing hardware, a height of the trailer coupler from the ground based on the vertical distance between the camera and the trailer coupler.

In some examples, the camera includes a monocular camera. Additionally or alternatively, the inertial measurement unit may include an acceleration and an angular velocity of the tow vehicle.

In some implementations, determining the distance further includes executing an iterated extended Kalman filter. Executing the iterated extended Kalman filter may include determining one or more current filter states based on the sensor data, the one or more visual feature points, and the one or more coupler feature points. In addition, executing the iterated extended Kalman filter includes: determining a pixel-wise intensity difference between a current image and a previously received image from the one or more images; and determining one or more updated filter states based on the current filter states and the pixel-wise intensity difference. The method may further include determining the distance between the camera and the trailer coupler based on the updated filter states. In some examples, the method further includes determining a camera position in a world coordinate system based on the updated filter states.

The details of one or more implementations of the disclosure are set forth in the accompanying drawings and the description below. Other aspects, features, and advantages will be apparent from the description and drawings, and from the claims.

DESCRIPTION OF THE DRAWINGS

FIG. 4 is a schematic view of an exemplary arrangement of operations for determining the distance between a tow vehicle and a trailer as shown FIGS. 1A-3B.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of determining a distance including a longitudinal distance, a lateral distance, and a vertical distance relative to a trailer positioned behind the tow vehicle. More specifically, it is desirable for the tow vehicle to determine a longitudinal distance, a lateral distance, and a vertical distance between a vehicle's rearward camera and a trailer coupler. As such, a tow vehicle with a distance estimation feature provides a driver and/or vehicle with information that aids in driving (driver or autonomously) the tow vehicle towards the trailer.

Figure 1A:
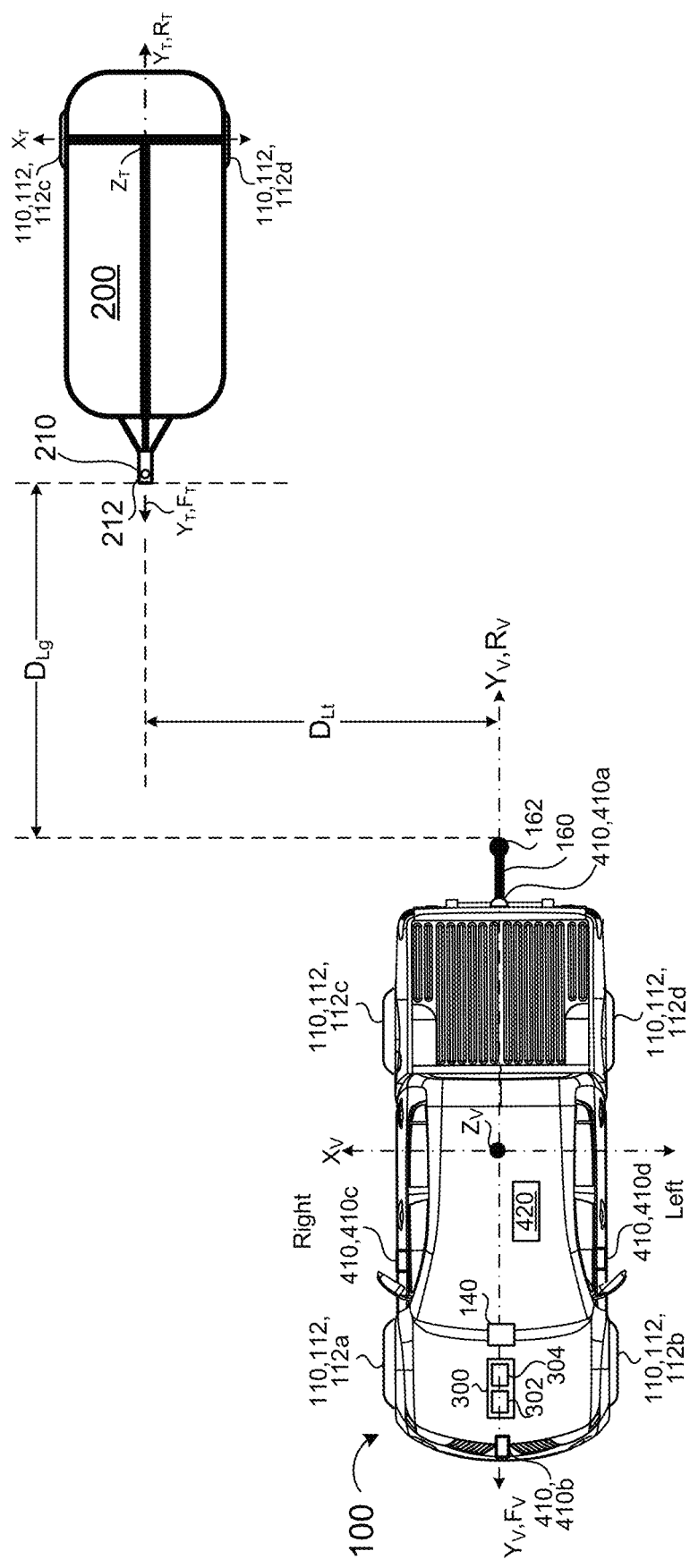
FIG. 1A is a schematic top view of an exemplary tow vehicle and trailer positioned behind the tow vehicle.
Figure 1B:
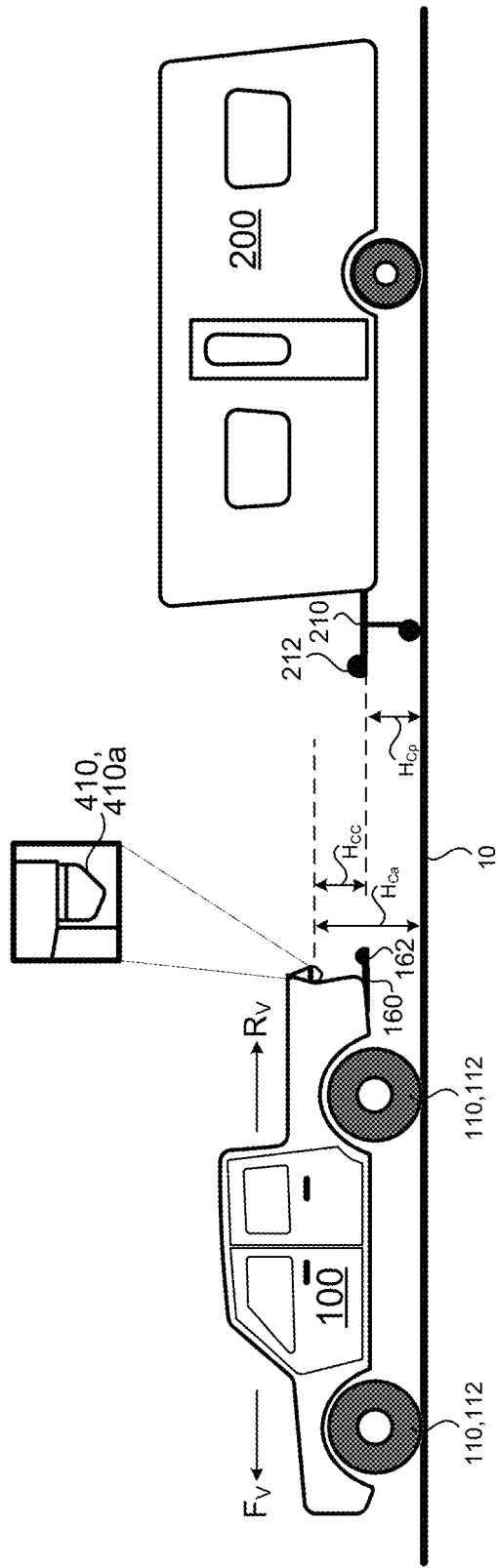
FIG. 1B is a schematic side view of the exemplary tow vehicle and the trailer shown in FIG. 1A.
Figure 2:
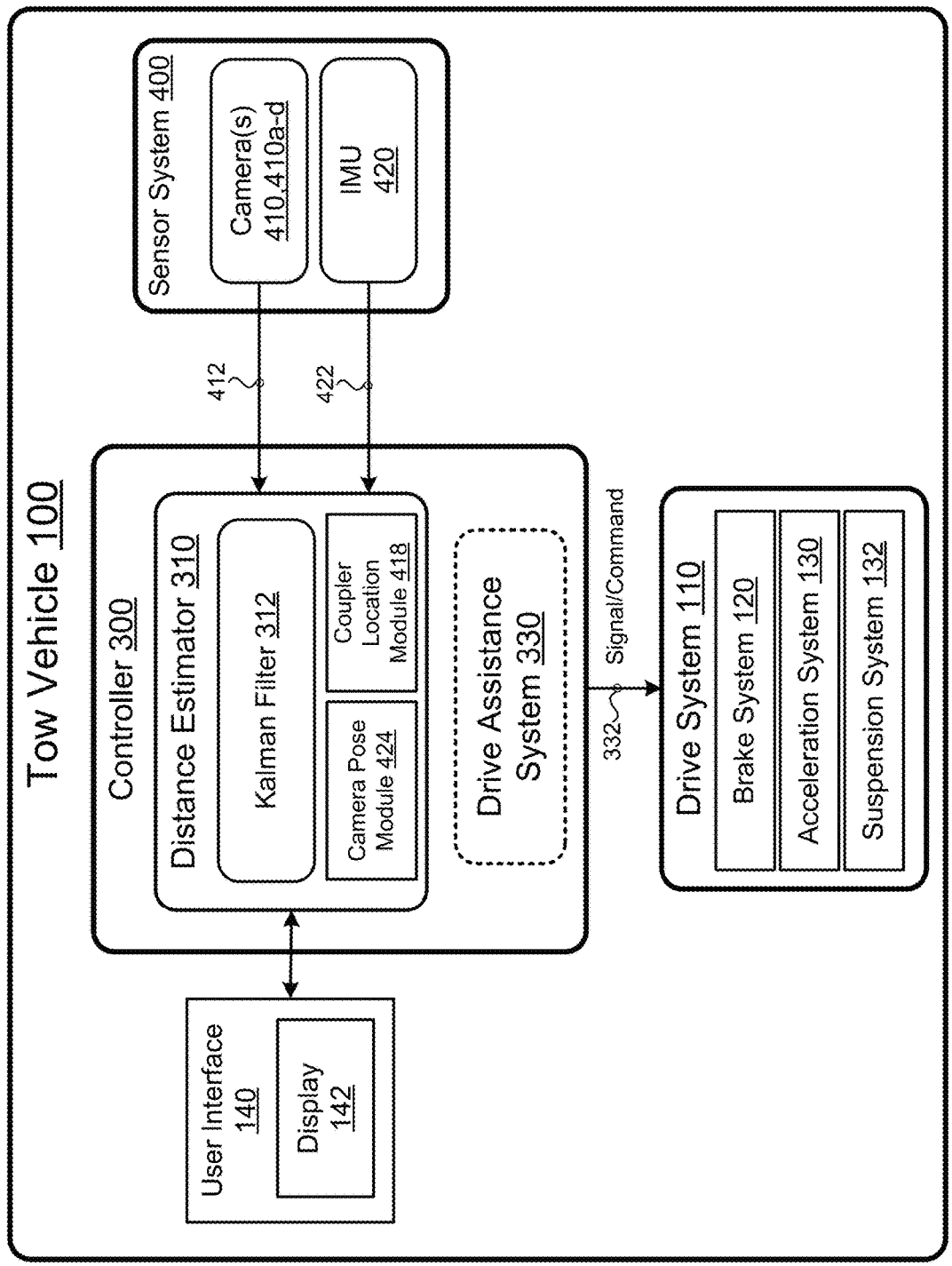
FIG. 2 is a schematic view of an exemplary tow vehicle having a controller, a user interface, a sensor system, and a drive system.

Referring to FIGS. 1A-2, in some implementations, a driver of a tow vehicle 100 wants to tow a trailer 200 positioned behind the tow vehicle 100. The tow vehicle 100 may be configured to receive an indication of a driver selection (for example, via a user interface device such as a display) associated with a selected trailer 200. In some examples, the driver maneuvers the tow vehicle 100 towards the selected trailer 200, while in other examples, the tow vehicle 100 autonomously drives towards the selected trailer 200. The tow vehicle 100 may include a drive system 110 that maneuvers the tow vehicle 100 across a road surface 10 based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 120 that includes brakes associated with each wheel 112, 112a-d, and an acceleration system 130 that is configured to adjust a speed and direction of the tow vehicle 100. In addition, the drive system 110 may include a suspension system 132 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 may be configured to adjust a height of the tow vehicle 100 allowing a tow vehicle hitch 160 (e.g., a tow vehicle hitch ball 162) to align with a trailer hitch 210 (e.g., trailer hitch coupler 212) and allowing the tow vehicle hitch ball 162 to be positioned under the trailer coupler 212, which allows for connection between the tow vehicle 100 and the trailer 200.

The tow vehicle 100 may move across the road surface by various combinations of movements relative to three mutually perpendicular axes defined by the tow vehicle 100: a transverse axis $X_V$, a fore-aft axis $Y_V$, and a central vertical axis $Z_V$. The transverse axis $X_V$, extends between a right side and a left side of the tow vehicle 100. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. When the suspension system 132 adjusts the suspension of the tow vehicle 100, the tow vehicle 100 may tilt about the transverse axis $X_V$ and or the fore-aft axis $Y_V$, or move along the central vertical axis Z.

The tow vehicle 100 may include a user interface 140, such as, a display. The user interface 140 receives one or more user commands from the driver via one or more input mechanisms or a touch screen display 142 and/or displays one or more notifications to the driver. The user interface 140 is in communication with a vehicle controller 300, which is in turn in communication with a sensor system 400. In some examples, the user interface 140 displays an image of an environment of the tow vehicle 100 (for example, the rear environment of the tow vehicle 100) leading to one or more commands being received by the user interface 140 (from the driver) that initiate execution of one or more behaviors. In some examples, the user display 142 displays one or more trailer representations (not shown), where each trailer representation is associated with a trailer 200 positioned behind the tow vehicle 100. In this case, the driver selects a trailer representation associated a trailer 200, and based on the driver selection, the controller 300 determines a distance between the trailer 200 associated with the trailer representation and the tow vehicle 100. In other examples, the controller 300 detects one or more trailers 200 and determines the distance to the one or more trailers 200 simultaneously. The controller 300 may instruct the display 142 to display the one or more trailer representations and the distance to a representation selected by the driver, or a distance to each one of the one or more trailers 200. The vehicle controller 300 includes a computing device (or processor) 302 (e.g., central processing unit having one or more computing processors) in communication with non-transitory memory 304 (e.g., a hard disk, flash memory, random-access memory) capable of storing instructions executable on the computing processor(s) 302.

The tow vehicle 100 may include a sensor system 400 to provide reliable and robust driving. The sensor system 400 may include different types of sensors that may be used separately or with one another to create a perception of the environment of the tow vehicle 100. The sensor system 400 aids the driver in make intelligent decisions based on objects and obstacles detected by the sensor system 400 or aids the drive system 110 in autonomously maneuvering the tow vehicle 100.

The sensor system 400 may include one or more cameras 410, 410a-d supported by the tow vehicle 100 to capture images 412 of the environment of the tow vehicle 100. In some implementations, the tow vehicle 100 includes a rear camera 410, 410a that is mounted on a rear portion of the tow vehicle 100 to provide a view of a rear driving path for the tow vehicle 100. In addition, the rear camera 410 is positioned such that it captures a view of the tow vehicle hitch ball 162. In some examples, the rear camera is a monocular camera 410a that produces a two-dimensional image. Other camera types may also be used.

The sensor system 400 also includes an IMU (inertial measurement unit) 420 configured to measure a linear acceleration of the tow vehicle 100 (using one or more accelerometers) and a rotational rate of the tow vehicle 100 (using one or more gyroscopes). In some examples, the IMU 420 also determines a heading reference of the tow vehicle 100. Therefore, the IMU 420 determines the pitch, roll, and yaw of the tow vehicle 100. The sensor system 400 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), etc.

Referring to FIG. 2, the vehicle controller 300 executes a distance estimator 310 that receives images 412 from the rear camera 410a and IMU sensor data 422 from the IMU 420 and determines a distance including a longitudinal distance $D_{Lg}$, a lateral distance $D_{Lt}$, and a vertical distance $H_{CC}$ between the camera 410 and the trailer coupler 212 associated with the trailer 200 identified by the driver via the user interface 140. The distance estimator 310 may determine the coupler height $H_{CP}$ based on the vertical distance $H_{CC}$.

In some implementations, the controller 300 sends the determined longitudinal distance $D_{Lg}$, the lateral distance $D_{Lt}$, and the vertical distance $H_{CC}$ and/or the coupler height $H_{CP}$ to the user interface 140, for example, the display 142, to be displayed to the driver. The longitudinal distance $D_{Lg}$, the lateral distance $D_{Lt}$, and the vertical distance $H_{CC}$ and/or the coupler height $H_{Cp}$ are considered by the driver while backing up the tow vehicle 100 towards the trailer 200 or by a drive assistance system 330 while the tow vehicle 100 is autonomously maneuvering towards the trailer 200. In some examples, the controller 300 includes the drive assistance system 330 that receives the longitudinal distance $D_{Lg}$, the lateral distance $D_{Lt}$, and the vertical distance $H_{CC}$ and/or the coupler height $H_{Cp}$ and based on the received information determines a path between the tow vehicle 100 and the trailer 200 leading the tow vehicle 100 to align with the trailer 200 for hitching. In addition, the drive assistance system 330 sends the drive system 110 one or more commands 332 causing the drive system 110 to autonomously maneuver the tow vehicle 100 in a rearwards direction $R_V$ towards the trailer 200. In some examples, the drive assistance system 330 instructs the drive system 110 to position the tow vehicle 100 such that the fore-aft axis $Y_V$ of the tow vehicle 100 and the fore-aft axis YT of the trailer 200 are coincident.

In some implementations, the distance estimator 310 receives the camera images 412 and the IMU sensor data 422 and executes an iterative extended Kalman filter 312 that fuses camera image data 413 associated with the camera images 412 and the IMU sensor data 422. Based on the fused data being the updated filter states 314u (i.e., the camera image data 413 and the IMU sensor data 422), the distance estimator 310 determines the longitudinal distance $D_{Lg}$, the lateral distance $D_{Lt}$, and the coupler height $H_{Cp}$ from the road surface 10 which is determined based on the vertical distance $H_{CC}$ between the camera 410 and the trailer coupler 212. The iterative extended Kalman filter 312 uses a dynamic model, such as, for example, known control inputs from the camera 410a and the IMU 420 to the distance estimator 310, and multiple sequential measurements (from the camera 410a and the IMU 420) to determine an estimate of the varying quantities being the distance between the tow vehicle 100 and the trailer 200. In some examples, the Iterated extended Kalman filter 312 continuously determines the longitudinal distance $D_{Lg}$, the lateral distance $D_{Lt}$, and the vertical distance $H_{CC}$ (or coupler height $H_{Cp}$) while the tow vehicle 100 is moving towards the trailer 200. Since the images 412 and the IMU sensor data 422 are updated as the tow vehicle 100 approaches the selected trailer 200, then the longitudinal distance $D_{Lg}$, the lateral distance $D_{Lt}$, and the vertical distance $H_{CC}$ (or coupler height $H_{Cp}$) of the selected trailer 200 with respect to the tow vehicle 100 also change as the tow vehicle 100 moves closer to the selected trailer 200.

Figure 3A:
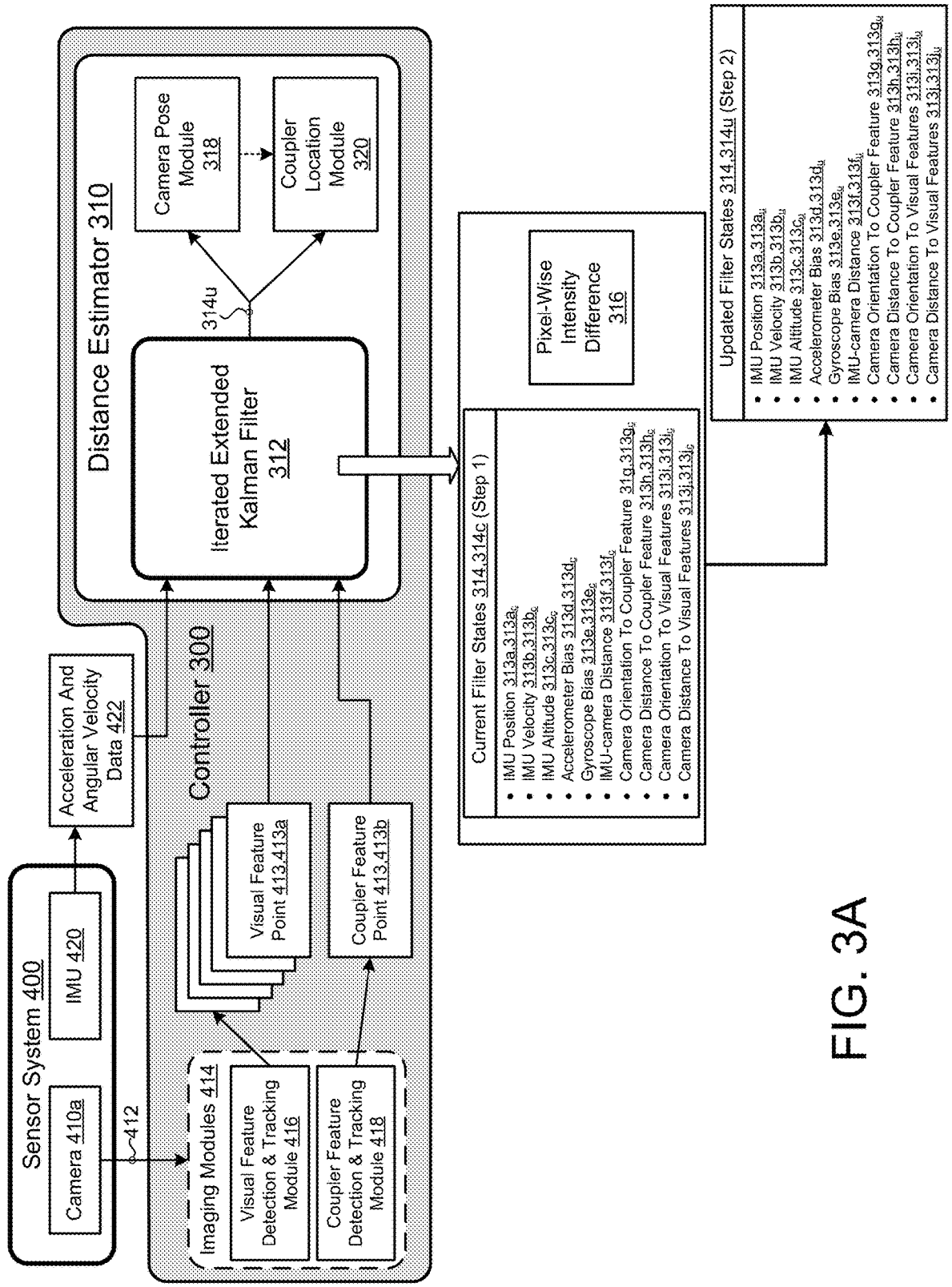
FIGS. 3A and 3B are schematic views of exemplary distance estimators shown in FIG. 2.
Figure 3B:
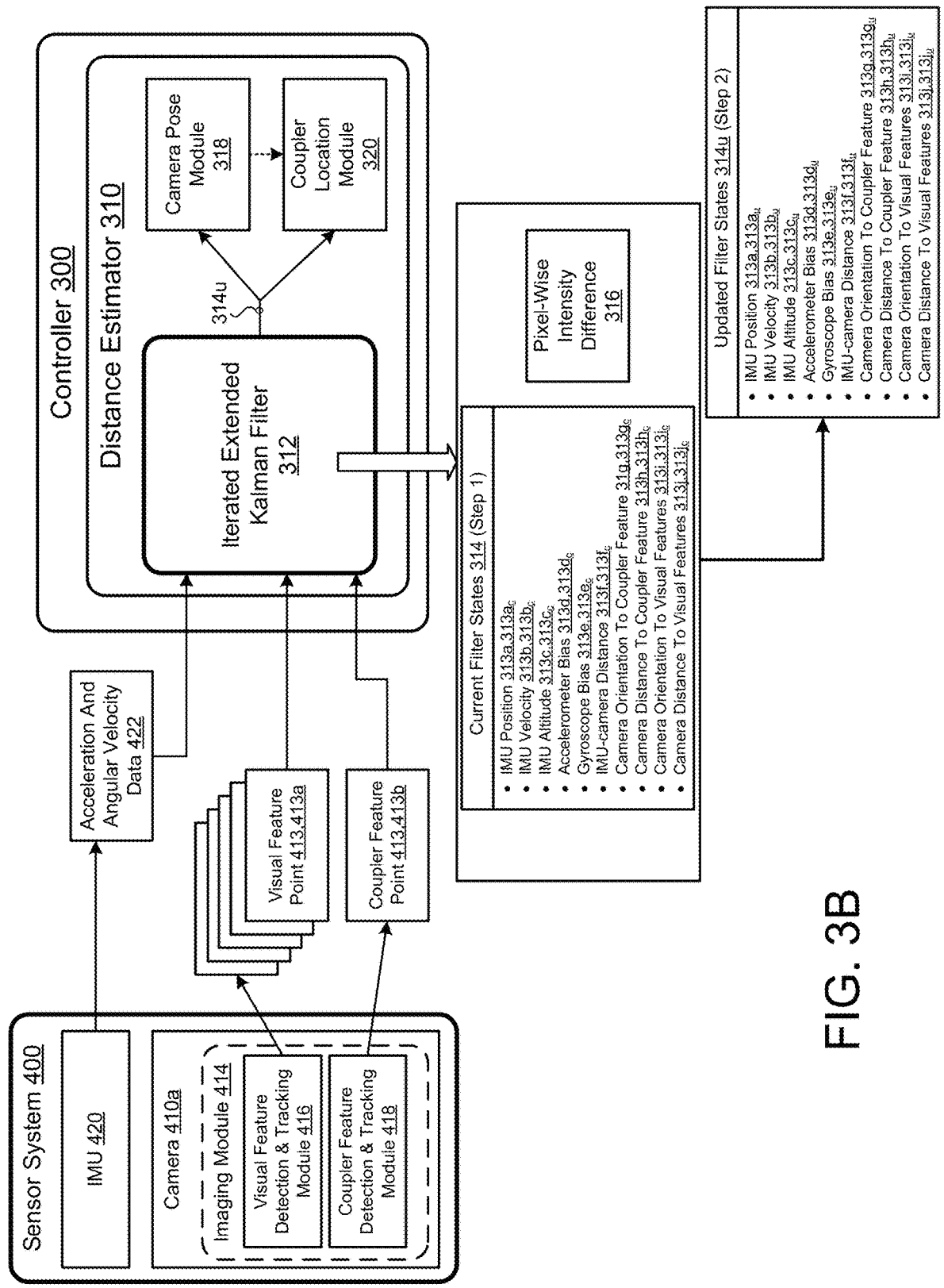

Referring to FIGS. 3A and 3B, in some implementations, the IMU 420 determines an acceleration and angular velocity associated with the tow vehicle 100 and sends the acceleration and angular velocity data 422 (i.e., IMU sensor data) to the iterated extended Kalman filter 312 of the controller 300. In addition, the rearward camera 410a captures images 412 that are analyzed resulting in camera image data 413, 413a, 413b. In some examples as shown in FIG. 3A, the controller 300 includes an imaging module 414 for analyzing the captured images 412. In other examples, as shown in FIG. 3B, the camera 410a includes the imaging module 414. With continued reference to FIGS. 3A and 3B, the imaging module 414 analyzes the images 412 captured by the camera 410a and outputs camera image data 413 associated with the received images 412. The imaging module 414 may include a visual feature detection and tracking module 416 and a coupler feature detection and tracking module 418. The visual feature detection and tracking module 416 detects and tracks visual features of the vehicle environment within each captured image 412 and determines visual feature points 413a. The visual feature points 413a may be, for example, a tree, a house, a pole, or any other object. The coupler feature detection and tracking module 418 detects the trailer coupler 212 and tracks the trailer coupler 212 while the tow vehicle 100 is moving towards the trailer 200. The visual/coupler feature detection and tracking modules 416, 418 associate one or more feature point 413a, 413b with the visual feature or the coupler and track the one or more feature points 413a, 413b. Since the coupler feature detection and tracking module 418 detects and tracks the trailer coupler 212 and pixel positions associated with the trailer coupler 212, then the trailer coupler 212 does not need a marker positioned on the coupler 212 as a reference for the controller 300 to detect and recognize the trailer coupler 212. This reduces the operation complexity and production cost of the vehicle/trailer system.

An extended Kalman filter is a nonlinear version of the Kalman filter which linearizes about an estimate of the current mean and covariance. The Kalman filter is an algorithm that uses a series of measurements observed over time, and including statistical noise and other inaccuracies, and outputs estimates of unknown variables that are more accurate than those based on a one measurement, because the Kalman filter 312 estimates a joint probability distribution over variables for each timeframe. The Kalman filter executes its calculations in a two-step process. During the first step, also referred to as the prediction step, the Kalman filter determines current states 314c (states 313, $313a_c$-$313j_c$), along with uncertainties associated with each current state variable 313a-j. When the outcome of the present measurement is observed, in the second step also known as the update step, these current states 314c (states 313, $313a_c$-$313j_c$) are updated using a weighted average, with more weight being given to the one with higher certainty (either current states 314c (states 313, $313a_c$-$313j_c$) or the present measurement). The algorithm is recursive, and runs in real time, using the present input measurements and the current filter states 314c (states 313, $313a_c$-$313j_c$) to determine updated filter states 314u (states 313, $313a_u$-$313j_u$), thus no additional past information is needed. An iterated extended Kalman filter 312 improves the linearization of the extended Kalman filter by reducing the linearization error at the cost of increased computational requirement.

The iterated extended Kalman filter 312 receives the IMU sensor data 422 from the IMU 420 and the camera image data 413, 413a, 413b (i.e., the visual feature points 413a and the coupler feature points 413b). In some implementations, the Iterated extended Kalman filter 312 determines filter states 314, 314c, 314u that update continuously based on the received IMU sensor data 422 and the camera image data 413, 413a, 413b. The filter states 314, 314c, 314u may include calibrated values such as a distance 313f between the IMU 420 and the rear camera 410a since the position of both within the tow vehicle 100 is known. In some examples, the filter states 314, 314c, 314u include an IMU position state 313a, an IMU velocity state 313b, and an IMU altitude state 313c that are determined by the iterated extended Kalman filter 312 based on the acceleration and the angular velocity data 422, the calibrated distance 313f between the IMU 420 and the rear camera 410a, and the position of the camera 410a in a coordinate system, for example a world coordinate system. The world coordinate system defines the world origin (a point whose coordinates are [0,0,0]) and defines three-unit axes orthogonal to each other. The coordinate of any point in the world space are defined with respect to the world origin. Once the world coordinate system is defined, the position of camera 410a may be defined by a position in the world space and the orientation of camera 410a may be defined by three-unit vectors orthogonal to each other. In some examples, the world origin is defined by the initial position of the camera, and the three-unit axes are defined by the initial camera orientation. The position of the camera 410a is determined or known by the camera pose module 318 as will be described below. As previously mentioned, the IMU 420 includes an accelerometer for determining the linear acceleration and a gyroscope for determining the rotational rate. In addition, in some examples, the filter states 314, 314c, 314u include an Accelerometer bias state 313d and a Gyroscope bias state 313e. The inertial sensors such as accelerometer and gyroscope often include small offset in the average signal output, even when there is no movement. The Accelerometer bias state 313d estimates the small offset of the accelerometer sensor in the average signal output, and the Gyroscope bias state 313e estimates the small offset of the gyroscope sensor in the average signal output.

In some examples, the filter states 314, 314c, 314u include a camera orientation to coupler feature state 313g being the orientation of the camera 410a to the one or more coupler feature points 413b identified by the camera module 414. The filter states 313 may also include a camera distance to coupler feature state 313h being the distance of the camera 410a to the one or more coupler feature points 413b identified by the camera module 414. In some examples, the filter states 314, 314c, 314u include a camera orientation to visual feature state 313i being the orientation of the camera 414 to the one or more visual feature points 413a identified by the camera module 414. The filter states 314, 314c, 314u may also include a camera distance to visual feature state 313j being the distance of the camera 410a to the one or more visual feature points 413a identified by the camera module 414.

The iterated extended Kalman filter 312 generates a first pixel-wise intensity difference 316 between the visual feature points 413a of a current image 412 and a previously tracked image 412 and a second pixel-wise intensity difference 316 between the coupler feature points 413b of the current image 412 and the previously tracked image 412. The extended iterated Kalman filter 312 determines the pixel-wise intensity difference 316 by running a routine on a pixel location of the current image 412 and the previously tracked image 412 and returns a result, then moves to the next pixel location and repeats the same routine, until all pixels of the current image 412 and the previously tracked image 412 are processed and the first and second pixel-wise intensity difference 316 is determined.

In a first step, the iterated extended Kalman filter 312 predicts current filter states 314c, $313a_c$-$313j_c$ based on the received acceleration and angular velocity data 422. In a second step, the iterated extended Kalman filter 312 updates the values of the current states $313a_c$-$313i_c$ based on the first and second pixel-wise intensity differences 316 between the tracked feature points 413a, 413b of a current image 412 and the previous corresponding feature points 413a, 413b of a previously tracked image 412 to update and correct the updated filter states 314u, $313a_c$-$313i_u$. Therefore, the current state $313a_c$-$313i_c$ of each of the mentioned state 314c is updated every time the iterated extended Kalman filter 312 receives data from the IMU 420 and the camera 410a.

The distance estimator 310 also includes a camera pose module 318 that calculates a location and orientation of the camera 410a in the world coordinate system based on the updated filter states 314u. The coupler location module 320 determines coupler longitudinal distance $D_{Lg}$, lateral distance $D_{Lt}$ and coupler height $H_{CC}$ relative to the location of the camera 410a based on the updated filter states 314u. In some examples, the coupler location module 320 may determine the coupler height $H_{Cp}$ in the world coordinate system based on the updated filter states 314u and the determined camera pose outputted by the camera pose module 318. Since the height $H_{Ca}$ of the vehicle camera 410a is known, the distance estimator 310 may determine the trailer coupler height $H_{Cp}$ based on the vertical distance $H_{CC}$ between the camera and the trailer coupler 212.

As previously discussed, the distance estimator 310 leverages the iterative extended Kalman filter 312 to fuse camera image data 413, 413a, 413b and IMU sensor data 422 to estimate and determine a location of the trailer coupler 212 relative to the vehicle camera 410. The coupler feature detection and tracking module 418 detects and tracks the coupler hitch 212. The distance estimator 310 may then determine the coupler longitudinal distance $D_{Lg}$, lateral distance $D_{Lt}$ and vertical distance $H_{CC}$ relative to the location of the camera 410a based on the received data 413a, 413b, 422. This provides high accuracy by using tightly coupled fusion techniques and increases robustness by leveraging coupler feature detection and tracking module 418 for updating current filter states 314c in the iterated extended Kalman filter 312. As described above, the distance estimator 310 utilizes low computational resource and achieves real time performance using low cost hardware. Moreover, the distance estimator 310 increases the robustness of the determination of the coupler location module 320 due to reliance on the analysis of the images 412 by the coupler feature detection and tracking module 418 for the filter state updates.

FIG. 4 provides an example arrangement of operations for a method 450 of determining a distance that includes a longitudinal distance $D_{Lg}$, a lateral distance $D_{Lt}$, and a vertical distance $H_{CC}$ between a camera 410a (e.g., a monocular camera 410a) positioned on a rear portion of a tow vehicle 100 and a trailer coupler 212 supported by a trailer 200 positioned behind the tow vehicle 100 as the tow vehicle 100 approaches the trailer 200. The method 450 using the vehicle 100 of FIGS. 1A-3B. At block 452, the method 450 includes identifying, by data processing hardware 300, the trailer coupler 212 of the trailer 200 within one or more images 412 of a rearward environment of the tow vehicle 100. At block 454, the method 450 includes receiving, at the data processing hardware 300, sensor data 422 (e.g., an acceleration and an angular velocity of the tow vehicle 100) from an inertial measurement unit 420 in communication with the data processing hardware 300 and supported by the tow vehicle 100. At block 456, the method 450 includes determining, by the data processing hardware 300, a pixel-wise intensity difference 316 between a current received image 412 from the one or more images 412 and a previously received image 412 from the one or more images 412. At block 458, the method 450 includes determining, by the data processing hardware 300, the distance $D_{Lg}$, $D_{Lg}$, $H_{CC}$ based on the identified trailer coupler 212, the sensor data 422, and the pixel-wise intensity difference 316.

In some implementations, the method 450 includes sending, from the data processing hardware 300 to a display 142 in communication with the data processing hardware 300, instructions to display 142 the distance $D_{Lg}$, $D_{Lt}$, $H_{CC}$. The method 450 may include sending, from the data processing hardware 300 to a drive assistance system 330 in communication with the data processing hardware 300, instructions to autonomously drive the tow vehicle 100 towards the trailer 200 based on the distance $D_{Lg}$, $D_{Lt}$, $H_{CC}$. In some examples, the method 450 includes determining, at the data processing hardware 300, a height $H_{CP}$ of the trailer coupler 212 from the ground 10 based on the vertical distance $H_{CC}$ between the camera 410a and the trailer coupler 212.

In some implementations, determining the distance $D_{Lg}$, $D_{Lt}$, $H_{CC}$ further includes: determining one or more current filter states 314, 314c based on the sensor data 422 and the identified trailer coupler 212; and determining one or more updated filter states 314, 314u based on the current filter states 314, 314c and the pixel-wise intensity difference 316. The method 450 may also include determining the distance $D_{Lg}$, $D_{Lt}$, $H_{CC}$ based on the updated filter states 314, 314u. In some examples, the method includes determining a camera position in a world coordinate system based on the updated filter states 314, 314u.

Figure 5:
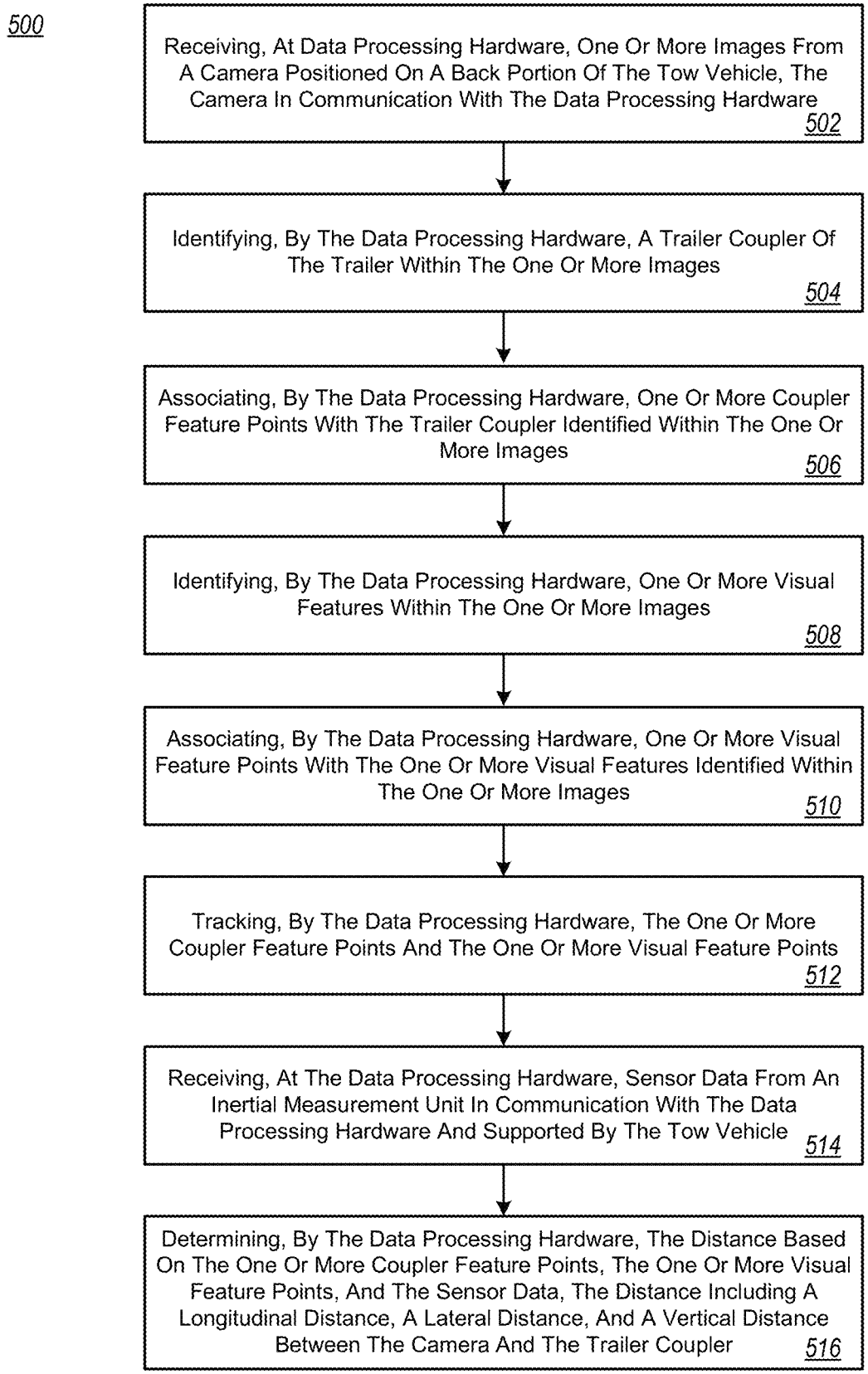
FIG. 5 is a schematic view of an exemplary arrangement of operations for determining the distance between a tow vehicle and a trailer as shown FIGS. 1A-3B.

FIG. 5 provides an example arrangement of operations for a method 500 of determining a distance that includes a longitudinal distance $D_{Lg}$, a lateral distance $D_{Lt}$, and a vertical distance $H_{CC}$ between a tow vehicle 100 and a trailer 200 positioned behind the tow vehicle 100 as the tow vehicle 100 approaches the trailer 200. The method 450 using the vehicle 100 of FIGS. 1A-3B. At block 502, the method 500 includes receiving, at data processing hardware 300, one or more images 412 from a camera 410a (e.g., a monocular camera 410a) positioned on a back portion of the tow vehicle 100. The camera 410a is in communication with the data processing hardware 300. At block 504, the method 500 includes identifying, by the data processing hardware 300, a trailer coupler 212 of the trailer 200 within the one or more images 412. At block 506, the method 500 includes associating, by the data processing hardware 300, one or more coupler feature points 413, 413b with the trailer coupler 212 identified within the one or more images 412. At block 508, the method 500 includes identifying, by the data processing hardware 300, one or more visual features within the one or more images 412. In addition, at block 510, the method 500 includes associating, by the data processing hardware 300, one or more visual feature points 413, 413a with the one or more visual features 413, 413a identified within the one or more images 412. At block 512, the method 500 includes tracking, by the data processing hardware 300, the one or more coupler feature points 413, 413b and the one or more visual feature points 413, 413a. At block 514, the method 500 includes receiving, at the data processing hardware 300, sensor data 422 from an inertial measurement unit 420 in communication with the data processing hardware 300 and supported by the tow vehicle 100. The sensor data may include an acceleration and an angular velocity of the tow vehicle 100. Additionally, at block 516, the method 500 includes determining, by the data processing hardware 300, the distance $D_{Lg}$, $D_{Lt}$, $H_{CC}$ based on the one or more coupler feature points 413, 413b, the one or more visual feature points 413, 413a, and the sensor data 422.

In some implementations, the method 500 includes sending, from the data processing hardware 300 to a display 142 in communication with the data processing hardware 300, instructions to display 142 the distance $D_{Lg}$, $D_{Lt}$, $H_{CC}$. The method 500 may also include sending, from the data processing hardware 300 to a drive assistance system 330 in communication with the data processing hardware 300, instructions to autonomously drive the tow vehicle 100 towards the trailer 200 based on the distance $D_{Lg}$, $D_{Lt}$, $H_{CC}$. In some examples, the method 500 includes determining, at the data processing hardware 300, a height $H_{CP}$ of the trailer coupler 212 from the ground 10 based on the vertical distance $H_{CC}$ between the camera 410a and the trailer coupler 212.

In some implementations, determining the distance $D_{Lg}$, $D_{Lt}$, $H_{CC}$ further includes executing an iterated extended Kalman filter 312. Executing the iterated extended Kalman Filter 312 includes determining one or more current filter states 314, 314c based on the sensor data 422, the one or more visual feature points 413, 413a, and the one or more coupler feature points 413, 413b. In some examples, executing the iterated extended Kalman Filter 312 also includes: determining a pixel-wise intensity difference 316 between a current image 412 and a previously received image 412 from the one or more images 412; and determining one or more updated filter states 314, 314u based on the current filter states 314, 314c and the pixel-wise intensity difference 316. In some examples, determining the distance $D_{Lg}$, $D_{Lt}$, $H_{CC}$ between the camera 410a and the trailer coupler 212 based on the updated filter states 314, 314u. The method 500 may also include determining a camera position in a world coordinate system based on the updated filter states 314, 314u.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for determining a distance between a camera positioned on a rear portion of a tow vehicle and a trailer coupler supported by a trailer positioned behind the tow vehicle as the tow vehicle approaches the trailer, the method comprising:
   identifying, by data processing hardware, the trailer coupler of the trailer within one or more images of a rearward environment of the tow vehicle captured by the camera;
   associating, by the data processing hardware, one or more coupler feature points with the trailer coupler identified within the one or images,
   identifying, by the data processing hardware, one or more visual features within the one or more images, the one or more visual features being different from the trailer coupler in the one or more images;
   associating, by the data processing hardware, one or more visual feature points with the one or more visual features identified within the one or more images;
   receiving, at the data processing hardware, sensor data from an inertial measurement unit in communication with the data processing hardware and supported by the tow vehicle;
   determining, by the data processing hardware, a first pixel-wise intensity difference between the one or more coupler feature points of a current received image from the one or more images and the one or more coupler feature points of a previously received image from the one or more images;
   determining, by the data processing hardware, a second pixel-wise intensity difference between the one or more visual feature points of a current received image from the one or more imagfes and the one or more visual feature points fo a previously received image from the one or more images; and
   determining, by the data processing hardware, the distance between the camera and the trailer coupler based on the identified trailer coupler, the sensor data, and the first and second pixel-wise intensity difference, the distance including a longitudinal distance, a lateral distance, and a vertical distance between the camera and the trailer coupler.

2. The method of claim 1, further comprising sending, from the data processing hardware to a display in communication with the data processing hardware, instructions to display the distance.

3. The method of claim 1, further comprising, sending, from the data processing hardware to a drive assistance system in communication with the data processing hardware, instructions to autonomously drive the tow vehicle towards the trailer based on the distance.

4. The method of claim 1, further comprising determining, at the data processing hardware, a height of the trailer coupler from the ground based on the vertical distance between the camera and the trailer coupler.

5. The method of claim 1, wherein the one or more images are captured by a monocular camera.

6. The method of claim 1, wherein the sensor data from the inertial measurement unit includes an acceleration and an angular velocity of the tow vehicle.

7. The method of claim 1, wherein the one or more current states comprise at least one of a current state associated with an orientation of the camera to the one or more coupler feature points, a current state associated with a distance of the camera to the one or more coupler feature points, a current state associated with an orientation of the camera to the one or more visual feature points, or a current state associated with a distance of the camera to the one or more visual feature points.

8. The method of claim 1, wherein determining the distance further comprises:
   determining one or more current filter states based on the sensor data and the identified trailer coupler; and
   determining one or more updated filter states based on the current filter states and the first and second pixel-wise intensity differences.

9. The method of claim 8, further comprising: determining the distance based on the updated filter states.

10. The method of claim 9, further comprising: determining a camera position in a world coordinate system based on the updated filter states.

11. A method for determining a distance between a tow vehicle and a trailer positioned behind the tow vehicle as the tow vehicle approaches the trailer, the method comprising:
   receiving, at data processing hardware, one or more images from a camera positioned on a back portion of the tow vehicle, the camera in communication with the data processing hardware;
   identifying, by the data processing hardware, a trailer coupler of the trailer within the one or more images;
   associating, by the data processing hardware, one or more coupler feature points with the trailer coupler identified within the one or more images;
   identifying, by the data processing hardware, one or more visual features within the one or more images, the one ore more visual features being different from the trailer coupler in the one or more images;
   associating, by the data processing hardware, one or more visual feature points with the one or more visual features identified within the one or more images;
   tracking, by the data processing hardware, the one or more coupler feature points and the one or more visual feature points;
   receiving, at the data processing hardware, sensor data from an inertial measurement unit in communication with the data processing hardware and supported by the tow vehicle; and
   determining, by the data processing hardware, a distance between the camera and the trailer coupler based on the one or more coupler feature points, the one or more visual feature points, and the sensor data, the distance including a longitudinal distance, a lateral distance, and a vertical distance between the camera and the trailer coupler.

12. The method of claim 11, further comprising sending, from the data processing hardware to a display in communication with the data processing hardware, instructions to display the distance.

13. The method of claim 11, further comprising, sending, from the data processing hardware to a drive assistance system in communication with the data processing hardware, instructions to autonomously drive the tow vehicle towards the trailer based on the distance.

14. The method of claim 11, further comprising determining, at the data processing hardware, a height of the trailer coupler from the ground based on the vertical distance between the camera and the trailer coupler.

15. The method of claim 11, wherein the camera includes a monocular camera.

16. The method of claim 11, wherein the sensor data from the inertial measurement unit includes an acceleration and an angular velocity of the tow vehicle.

17. The method of claim 11, wherein determining the distance further comprises executing an iterated extended Kalman filter.

18. The method of claim 17, wherein executing the iterated extended Kalman Filter includes determining one or more current filter states based on the sensor data, the one or more visual feature points, and the one or more coupler feature points.

19. The method of claim 18, wherein the one or more current filter states comprise at least one of a current filter state associated with an orientation of the camera to the one or more coupler feature points, a current filter state associated with a distance of the camera to the one or more coupler feature points, a current filter state associated with an orientation of the camera to the one or more visual feature points, or a current filter state associated with a distance of the camera to the one or more visual feature points.

20. The method of claim 18, wherein executing the iterated extended Kalman Filter includes:
   determining a first pixel-wise intensity difference between the one or more coupler feature points of a current image and the one or more coupler feature points of a previously received image from the one or more images;
   determining a second pixel-wise intensity difference between the one or more visual feature points of the current image and the one or more visual feature points of the previously received image from the one or more images; and
   determining one or more updated filter states based on the current filter states and the first and second pixel-wise intensity differences.

21. The method of claim 18, wherein executing the iterated extended Kalman Filter includes:
   determining a pixel-wise intensity difference between a current image and a previously received image from the one or more images; and
   determining one or more updated filter states based on the current filter states and the pixel-wise intensity difference.

22. The method of claim 21, further comprising: determining the distance between the camera and the trailer coupler based on the updated filter states.

23. The method of claim 22, further comprising: determining a camera position in a world coordinate system based on the updated filter states.

\* \* \* \* \*